United States Patent
Morimune et al.

[11] Patent Number: 6,151,141
[45] Date of Patent: Nov. 21, 2000

[54] ORIGINAL READING AND CONVEYING APPARATUS

[75] Inventors: Michinori Morimune; Hironori Tanaka, both of Yamatokoriyama, Japan

[73] Assignee: Sharp Kabushiki Kaisha, Osaka, Japan

[21] Appl. No.: 09/111,785

[22] Filed: Jul. 8, 1998

[30] Foreign Application Priority Data

Jul. 9, 1997 [JP] Japan .................................. P9-184101

[51] Int. Cl.⁷ ................................................... H04N 1/04
[52] U.S. Cl. ........................................... 358/498; 358/496
[58] Field of Search .................................. 358/496, 498, 358/474, 487, 400, 401; 270/314, 10.09, 10.11

[56] References Cited

U.S. PATENT DOCUMENTS 5,225,917  7/1993  Osako ..................................... 358/498

FOREIGN PATENT DOCUMENTS

3004160 U  8/1994  Japan .
6-227701   8/1994  Japan .

*Primary Examiner*—Cheukfan Lee
*Attorney, Agent, or Firm*—Nixon & Vanderhye

[57] ABSTRACT

An original reading and conveying apparatus comprises a transparent plate arranged in a reading area of a conveying passage for conveying an original, and a pressure conveying roller arranged to confront the transparent plate and be pushed toward the transparent plate. At least a circumferential surface of a roller portion the pressure conveying roller is covered with a synthetic resin layer. An original conveying roller is arranged at the downstream side, as viewed in the original conveying direction, of the pressure conveying roller and is rotationally driven by a driving force coming from the pressure conveying roller.

12 Claims, 4 Drawing Sheets

ORIGINAL READING AND CONVEYING APPARATUS

BACKGROUND OF THE INVENTION

1. Field of the Invention

The present invention relates to an original reading and conveying apparatus for reading an original conveyed through a predetermined conveying passage and for feeding the original in a predetermined direction.

2. Description of the Related Art

In a Japanese Unexamined Utility Model Publication JP-U 3004160, for example, there is disclosed a facsimile which is equipped with an original reading and conveying apparatus. The original reading and conveying apparatus, as disclosed in the Publication, has a construction shown in FIGS. 5 and 6. With reference to FIGS. 5 and 6, this known original reading and conveying apparatus has a transparent plate 4 arranged in a reading area 2 of an original conveying passage, and a pressure conveying roller 6 is arranged over the transparent plate 4. The pressure conveying roller 6 has a rotation axis 8 and a roller portion 10 mounted on the rotation axis 8. The roller portion 10 is usually made of rubber and is pushed onto the surface of the transparent plate 4. Both end portions of the rotation axis 8 are rotatably supported by bearings (not-shown). On one end portion of the rotation axis 8, for example, there is mounted a gear 12 which is connected to and driven by a drive motor 14 via a drive transmission mechanism (not-shown). Under the transparent plate 4, moreover, there is arranged a reading unit 16 for reading picture image information of an original being conveyed through the reading area 2.

In this original reading and conveying apparatus, an original to be read is conveyed in a direction indicated by arrow 18. The original thus conveyed is moved through a clearance between the transparent plate 4 and the pressure conveying roller 6. When the original is conveyed through the reading area 2, it is pushed toward the transparent plate 4 by the roller portion 10 of the pressure conveying roller 6. As a result, the reading unit 16 reads the original being pushed by the roller portion 10, through the transparent plate 4. On the other hand, the pressure conveying roller 6 is rotationally driven in a direction indicated by arrow 20 (shown in FIG. 6) by the action of the motor 14, so that the original on the transparent plate 4 is further fed to the downstream side by the rotation of the pressure conveying roller 6.

However, the original reading and conveying apparatus thus far described has the following problems to be solved. Firstly, for a sufficient conveying force, the roller portion 10 of the pressure conveying roller 6 is made of rubber, so that a relatively high frictional force accordingly acts between the transparent plate 4 and the pressure conveying roller 6. This makes it necessary to generate a high turning torque for rotationally driving the pressure conveying roller 6 and to employ a motor which outputs a high torque.

Secondly, the pressure conveying roller functions also as a conveying roller for feeding the original to the downstream side. As a result, the original is fed by the transparent plate 4 standing still and the pressure conveying roller 6 to be rotationally driven, so that the performance to discharge the original in the reading area is lowered.

SUMMARY OF THE INVENTION

An object of the invention is to provide an original reading and conveying apparatus capable of reliably feeding an original to a downstream side with a relatively low turning torque thereby to improve an original discharging performance.

In a first aspect of the invention, an original reading and conveying apparatus comprises a transparent plate arranged in a reading area of a conveying passage for conveying an original and a pressure conveying roller arranged to confront the transparent plate and be pushed toward the transparent plate, wherein at least a circumferential surface of a roller portion of the pressure conveying roller is covered with a synthetic resin layer, and wherein an original conveying roller for conveying the original is arranged at a downstream side, as viewed in an original conveying direction, of the pressure conveying roller, which original conveying roller is rotationally driven by a driving force coming from the pressure conveying roller.

According to the first aspect of the invention, at least the circumferential surface of the roller portion of the pressure conveying roller is covered with the synthetic resin layer, so that the pressure conveying roller has a small coefficient of friction. As a result, even when the pushing force of the pressure conveying roller onto the transparent plate is increased, the frictional force between them is not increased, so that a load of the pressure conveying roller can be reduced while a sufficient pushing force is retained. Further, since the original conveying roller disposed at the downstream side of the pressure conveying roller is rotationally driven by the driving force coming from the pressure conveying roller, a construction of the original conveying roller and its associated items is simplified.

In a second aspect of the invention, the original reading and conveying apparatus is characterized in that the roller portion of the original conveying roller is made shorter than the roller portion of the pressure conveying roller.

According to the second aspect of the invention, the roller portion of the pressure conveying roller is reduced in length in an axial direction thereof, so that the whole device can be made compact.

In a third aspect of the invention, the original reading and conveying apparatus is characterized in that a part of the roller portion of the pressure conveying roller is diametrically reduced to be a small diameter portion having a smaller external diameter than that of remaining part, and a driving force transmission mechanism for transmitting the driving force to the original conveying roller is interposed between the small diameter portion and the original conveying roller.

According to the third aspect of the invention, the small diameter portion is formed at a part of the roller portion of the pressure conveying roller, and the driving force transmission mechanism is interposed between the small diameter portion and the original conveying roller, so that the driving force transmission mechanism can be constructed simply and made compact.

In a fourth aspect of the invention, the original reading and conveying apparatus is characterized in that the driving force transmission mechanism is composed of a gear portion disposed at the small diameter portion of the roller portion of the pressure conveying roller, a gear disposed at a rotation axis of the original conveying roller, and an intermediate gear interposed between the gear portion and the gear.

According to the fourth aspect of the invention, the construction of the driving force transmission mechanism can be simplified.

In a fifth aspect of the invention, the original reading and conveying apparatus is characterized in that at least a circumferential surface of the roller portion of the original conveying roller is covered with a rubber layer.

According to the fifth aspect of the invention, the circumferential surface of the roller portion of the original conveying roller is covered with a rubber layer, so that a sufficient conveying force can be obtained from the original conveying roller to improve an ability to discharge the original from the reading area.

In a sixth aspect of the invention, the original reading and conveying apparatus further comprises a driven conveying roller cooperating with the original conveying roller, wherein at least a circumferential surface of a roller portion of the driven conveying roller is covered with a rubber layer, and wherein the driven conveying roller is elastically biased toward the original conveying roller.

According to the sixth aspect of the invention, at least the circumferential surface of the roller of the driven conveying roller is covered with a rubber layer, and the driven conveying roller is elastically biased toward the original conveying roller. Therefore, a sufficiently high conveying force can be obtained from the original conveying roller and the driven conveying roller, and the original can be reliably discharged from the reading area.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
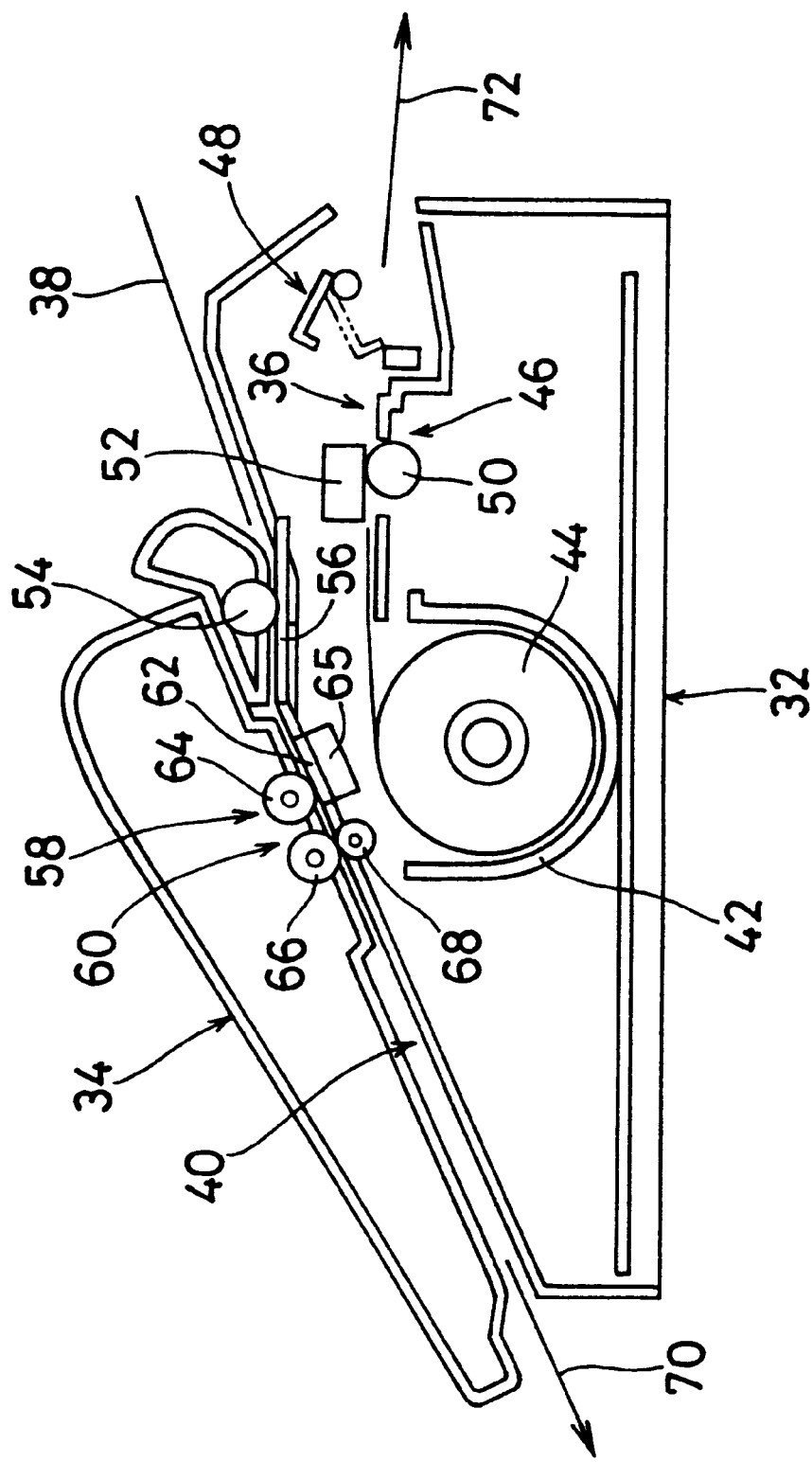
FIG. 1 is a schematic sectional view showing an example of a facsimile which is provided with an embodiment of an original reading and conveying apparatus according to the invention.

Now referring to the drawings, preferred embodiments of the invention are described below.

The invention will be described in more detail with reference to the accompanying drawings. FIG. 1 is a schematic sectional view showing an example of a facsimile which is provided with an embodiment of an original reading and conveying apparatus according to the invention.

In FIG. 1, the shown facsimile comprises a lower housing 32 and an upper housing 34 which is removably mounted on the lower housing 32. In this lower housing 32, there is formed a recording paper feeding passage 36 which extends to the right in FIG. 1. Further, between the lower housing 32 and the upper housing 34, there is formed an original conveying passage 40 for conveying an original 38. At one end (as located at the lefthand end of FIG. 1) of the recording paper feeding passage 36, there is disposed a recording paper receptacle 42 and a rolled recording paper 44 is turnably supported by the recording paper receptacle 42. The recording paper feeding passage 36 is equipped with a feed mechanism 46 and a cutter unit 48. The feed mechanism 46 is formed by a feed roller 50 which is rotationally driven in a predetermined direction, and a recording head 52 is disposed so as to confront the feed roller 50. This feed roller 50 pulls a leading end portion out of the rolled recording paper 44 and feeds it to the downstream side. On the other hand, the recording head 52 records, on the surface of the recording paper interposed between the recording head and the feed roller 50, record information, e.g., information corresponding to a received signal in a reception mode or information corresponding to the original to be copied in a copying mode. The cutter unit 48 cuts off the leading end portion which is pulled out of the rolled recording paper 44, at a predetermined length.

At one end of the original conveying passage 40, as located at the righthand end of FIG. 1, there is arranged an original feed roller 54, under which a separating member 56 is disposed for feeding the original 38 one by one in cooperation therewith. In an intermediate part of the original conveying passage 40 in a conveying direction, there is disposed an original reading area 58 which is equipped with an original reading and conveying apparatus 60. This original reading and conveying apparatus 60 is constructed, as shown, to comprise a transparent plate 62, a pressure conveying roller 64 cooperating with the transparent plate 62, an original reading unit 65 arranged under the transparent plate 62, an original conveying roller 66 and a driven conveying roller 68. The original reading and conveying apparatus 60 thus constructed will be described later in more detail.

The original 38 is fed through a clearance between the original feed roller 54 and the separating member 56 to the original conveying passage 40. After conveyed through the original reading area 58, the original 38 is discharged, as indicated by arrow 70, from the original conveying passage 40. While the original 38 is conveyed through the original reading area 58, the reading unit 65 reads picture image information out of the original 38.

In this facsimile, the following actions are made in the individual modes. In the transmission mode, a leading end portion of the original 38 to be transmitted is placed on the separating member 56 and the original 38 is fed one by one to the original conveying passage 40 by the action of the original feed roller 54. The original 38 thus fed to the original conveying passage 40 is conveyed through the original reading area 58, and the reading unit 65 reads the picture image information out of the original 38 while the original passes through the original reading area 58, so that the read-out picture image information is transmitted as desired.

In the reception mode, the feed roller 50 is rotationally driven in a predetermined direction, whereby the rolled recording paper 44 is fed through the recording paper feeding passage 36. On the recording paper to be fed through the recording paper feeding passage 36, the received information is recorded by the recording head 52, and the recording paper bearing the information is further fed downstream. The recording paper thus fed through the recording paper feeding passage 36 is cut off to a predetermined length by the cutter unit 48, so that the cut-off recording paper is discharged, as indicated by arrow 72, from the recording paper feeding passage 36.

Further, in the copying mode, the leading end portion of the original 38 to be copied is placed on the separating member 56, and the original 38 is fed one by one to the original conveying passage 40, as described hereinbefore. When the original 38 passes through the original reading area 58, the picture image information is read out of the original 38 by the reading unit 65. On the other hand, the leading end portion of the rolled recording paper 44 is pulled out and fed to the recording paper feeding passage 36 by the action of the feed roller 50. When the recording paper passes through the recording head 52, the picture image information read out by the reading unit 65 is recorded on the recording paper by the action of the recording head 52. The recording paper bearing the picture image information is cut off by the cutter unit 48 and then discharged from the recording paper feeding passage 36.

Figure 2:
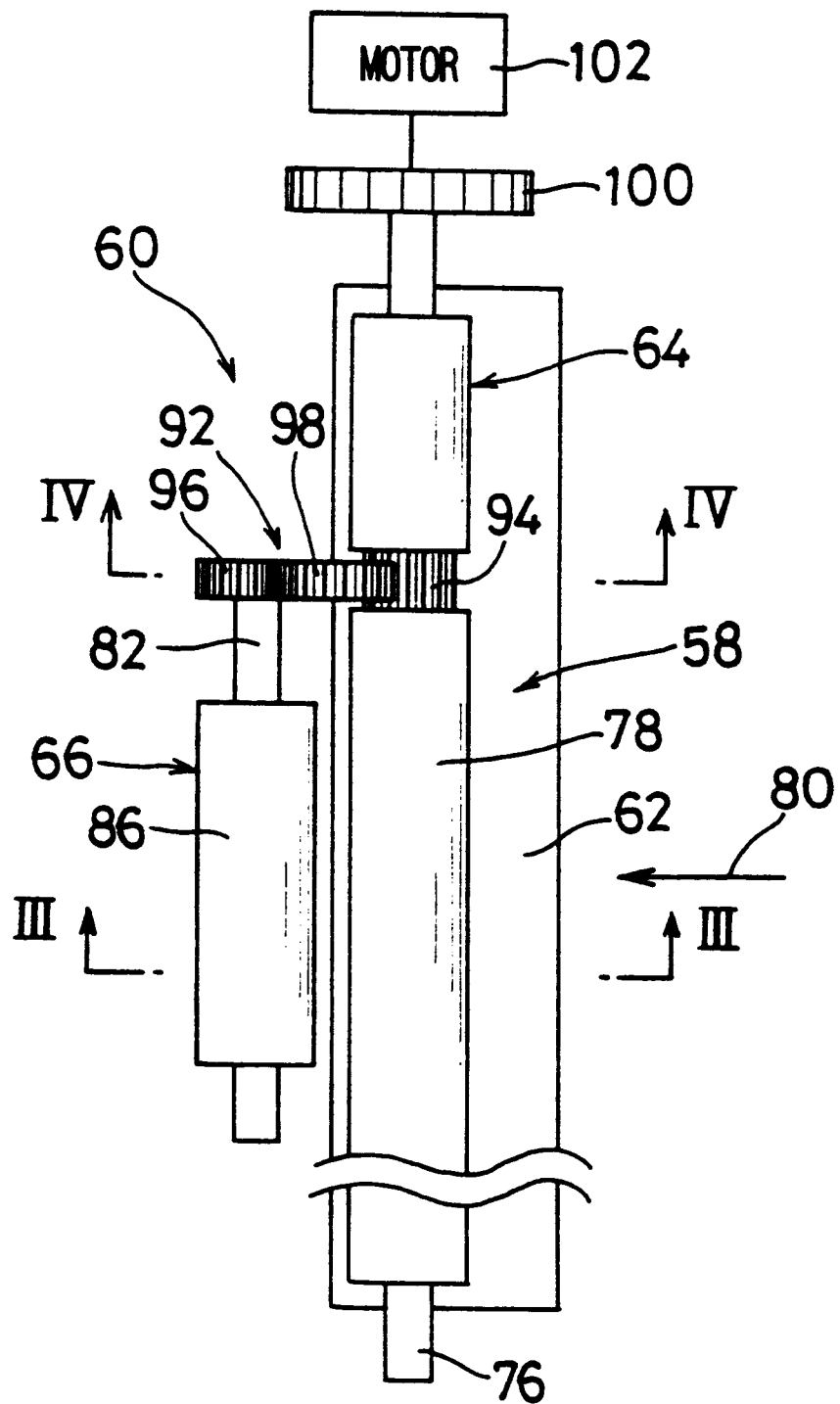
FIG. 2 is a top plan view showing the original reading and conveying apparatus in the facsimile of FIG. 1.
Figure 3:
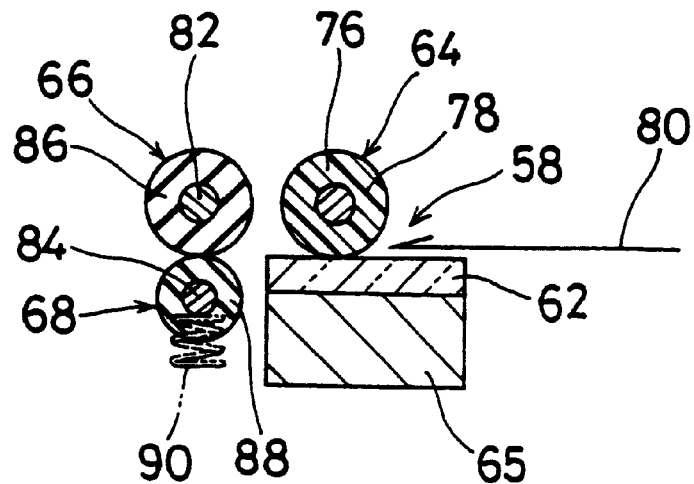
FIG. 3 is a sectional view taken along line III—III of FIG. 2.
Figure 4:
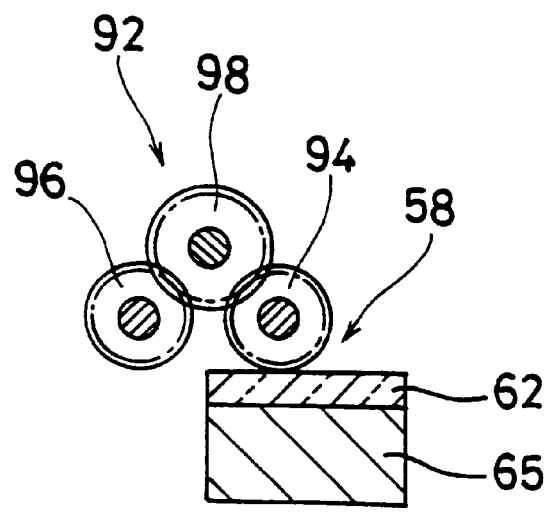
FIG. 4 is a sectional view taken along line IV—IV of FIG. 2.
Figure 5:
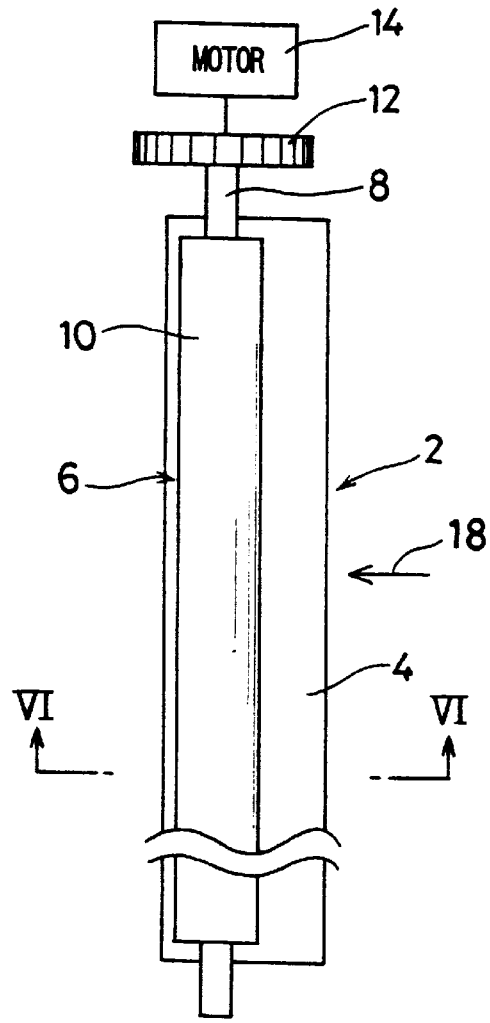
FIG. 5 is a top plan view showing an original reading and conveying apparatus of the prior art.
Figure 6:
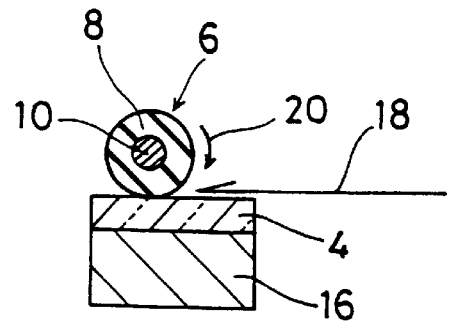
FIG. 6 is a sectional view taken along line VI—VI of FIG. 5.

Next, the original reading and conveying apparatus 60 will be described with reference to FIGS. 2 to 4. FIG. 2 is a top plan view showing the original reading and conveying apparatus; FIG. 3 is a sectional view taken along line III—III of FIG. 2; and FIG. 4 is a sectional view taken along line IV—IV of FIG. 2.

In FIGS. 2 and 3, the transparent plate 62 of the shown original reading and conveying apparatus 60 is disposed in the original reading area 58. This transparent plate 62 is made of glass. The pressure conveying roller 64 is arranged opposite to and over the transparent plate 62. The pressure conveying roller 64 is equipped with a rotation axis 76 and a roller portion 78 mounted on the rotation axis 76, and this roller portion 78 is pushed toward the surface of the transparent plate 62. As a result, the original 38 (shown in FIG. 1) to be conveyed through the clearance between the pressure conveying roller 64 and the transparent plate 62 is pushed onto the transparent plate 62 on the reading line of the reading area 58. In this embodiment, the roller portion 78 is made of a synthetic resin material such as silicone rubber, as a whole. It is, however, essential that at least the circumferential surface of the roller portion 78 is made of the synthetic resin material. By thus forming the layer of the synthetic resin material on at least the circumferential surface of the roller portion 78 of the pressure conveying roller 64, a frictional force between the roller portion 78 and the transparent plate 62 can be reduced even when a pushing force from the pressure conveying roller 64 is high, so that the load on the pressure conveying roller 64 can be lowered.

The original reading unit 65 is formed by a contact sensor for reading the picture image information of the original 38, for example. This reading unit 65 can be replaced with an original reading optical system.

The original conveying roller 66 is arranged at the downstream side, as seen in a conveying direction of the original 38 indicated by arrow 80, of the pressure conveying roller 64, and the driven conveying roller 68 is disposed under the original conveying roller 66. By thus providing the rollers 66 and 68, the pressure conveying roller 64 and the original conveying roller 66 regulate one side, i.e., the upper side of the original conveying passage 40, whereas the transparent plate 62 and the driven conveying roller 68 regulate the other side, i.e., the lower side of the original conveying passage 40.

The original conveying roller 66 and the driven conveying roller 68 are respectively equipped with rotation axes 82 and 84, and roller portions 86 and 88 are respectively integrated with the rotation axes 82 and 84. In this embodiment, the roller portions 86 and 88 of the original conveying roller 66 and the driven conveying roller 68 are made of rubber material, as a whole. It is desirable that at least their circumferential surfaces are made of rubber material. Thus, at least the circumferential surfaces of the roller portions 86 and 88 are provided with layers made of rubber material, so that the frictional forces of the original conveying roller 66 and the driven conveying roller 68 is increased to enhance their ability to convey the original 38. The driven conveying roller 68 is further equipped with a pair of pressure springs 90 (only one thereof is shown in FIG. 3). These pressure springs 90 are formed by coil springs, which are arranged at both end portions of the rotation axis 84 of the driven conveying roller 68. The pressure springs 90 elastically bias the driven conveying roller 68 upward toward the original conveying roller 66. Accordingly, the original conveying roller 66 and the driven conveying roller 68 are held in a nipping state and a sufficiently high conveying force can be obtained.

In this embodiment, the roller portions 86 and 88 of the original conveying roller 66 and the driven conveying roller 68 are set to have a length in the axial direction (in the vertical direction in FIG. 2 and in a direction normal to the drawing in FIG. 3) which is smaller than the length in the axial direction of the roller portion 78 of the pressure conveying roller 64. In this respect, a rotationally driving force from the pressure conveying roller 64 is transmitted via the driving force transmission mechanism 92 to the original conveying roller 66. With additional reference to FIG. 4, the shown driving force transmission mechanism 92 is composed of a gear portion 94 provided in the roller portion 78 of the pressure conveying roller 64, a gear 96 mounted at one end portion of the rotation axis 82 of the original conveying roller 66, and an intermediate gear 98 interposed between the gear potion 94 and the gear 96. A part of the roller portion 78 of the pressure conveying roller 64 is formed to be a small diameter portion having a smaller external diameter than that of the remaining part and the gear portion 94 is disposed at the small diameter portion. Since the external diameter is reduced at the part corresponding to the gear portion 94, the gear portion 94 exerts no action on the original 38 being conveyed. With this driving force transmission mechanism 92, a simple configuration can be realized. Further, when the pressure conveying roller 64 is rotationally driven in the predetermined direction, this rotationally driving force is transmitted via the intermediate gear 98 and the gear 96 to the original conveying roller 66. As a result, the original conveying roller 66 is rotated in the same direction as that of the pressure conveying roller 64, and the driven conveying roller 68 is driven to rotate in the opposite direction to that of the original conveying roller 66. Here, the gear 96 of the driving force transmission mechanism 92 is disposed on the rotation axis 82 of the original conveying roller 66. Alternatively, a part of the roller portion 86 can be formed to be a small diameter portion as in the pressure conveying roller 64, to provide the small diameter portion with the gear portion. Since the rotationally driving force of the pressure conveying roller 64 is thus transmitted from the roller portion 78 to the original conveying roller 66, the original conveying roller 66 can be shortened, and the driven conveying roller 68 can also be shortened to make the original reading and conveying apparatus 60 compact.

With reference to FIG. 2 again, a toothed pulley 100 is mounted on one end portion of the rotation axis 76 of the pressure conveying roller 64, and the toothed pulley 100 is connected to a drive motor 102 via a chain (not-shown). Accordingly, when the drive motor 102 is energized, it drives the pressure conveying roller 64 to rotate in the predetermined direction.

Here will be described the actions of the original reading and conveying apparatus 60 by referring to FIGS. 2 and 3 mainly. When the original 38 (FIG. 1) to be read out is conveyed through the original conveying passage 40, the drive motor 102 is energized to drive the pressure conveying roller 64 to rotate in the predetermined direction. When the original 38 to be read out is conveyed to the original reading area 58, it is inserted into the clearance between the pressure conveying roller 64 and the transparent plate 62. Then, the inserted original 38 is pushed onto the transparent plate 62 by the pushing action of the pressure conveying roller 64, so that the picture image information of the original 38 on the reading line (corresponding to the nip portion between the roller portion 78 of the pressure conveying roller 64 and the transparent plate 62) is read out by the reading unit 65 through the transparent plate 62. Since the roller portion 78 of the pressure conveying roller 64 is made of the synthetic resin material, the load on the rotation is not increased even when the pushing force to the original 38 is raised, so that the original can be accordingly accurately read out by retaining the proper pushing force.

The original whose picture image information has been read out is conveyed toward the original conveying roller 66 by the conveying action of the pressure conveying roller 64. When the leading end portion of this original 38 is inserted into the clearance between the original conveying roller 66 and the driven conveying roller 68, it is further conveyed to the downstream side by the actions of those rollers 66 and 68. Since the roller portions 86 and 88 of the original conveying roller 66 and the driven conveying roller 68 are made of the rubber material, a sufficient conveying force can be obtained, so that the read original 38 is reliably conveyed to the downstream side by the rollers 66 and 68 and reliably discharged from the original reading area 58.

Although the original reading and conveying apparatus according to the invention has been described hereinbefore in connection with its one embodiment, the invention should not be limited thereto but can be modified and corrected in various manners without departing from the gist thereof.

In the shown embodiment, for example, the driving force transmission mechanism is exemplified by a gear train structure, but this gear train structure can be replaced with a belt transmission structure having a combination of a pulley and a belt.

In the shown embodiment, moreover, the original reading and conveying apparatus according to the invention is applied to the facsimile, but can be likewise applied to a scanner apparatus and an originating apparatus.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An original reading and conveying apparatus comprising:
    a transparent plate arranged in a reading area of a conveying passage for conveying an original and a pressure conveying roller arranged to confront the transparent plate and be pushed toward the transparent plate,
    at least a circumferential surface of a roller portion of the pressure conveying roller being covered with a synthetic resin layer,
    an original conveying roller for conveying the original arranged at a downstream side, as viewed in an original conveying direction, of the pressure conveying roller, which original conveying roller is rotationally driven by a driving force coming from the pressure conveying roller;
    the roller portion of the original conveying roller being axially shorter than the axial extent of the roller portion of the pressure conveying roller; and
    a part of the roller portion of the pressure conveying roller being provided with a small diameter portion having a smaller external diameter than that of the remaining part, and a driving force transmission mechanism for transmitting the driving force to the original conveying roller being interposed between the small diameter portion and the original conveying roller.

2. The original reading and conveying apparatus of claim 1 wherein at least a circumferential surface of the roller portion of the original conveying roller is covered with a rubber layer.

3. The original reading and conveying apparatus of claim 1, further comprising a driven conveying roller cooperating with the original conveying roller,
    wherein at least a circumferential surface of a roller portion of the driven conveying roller is covered with a rubber layer, and the driven conveying roller is elastically biased toward the original conveying roller.

4. The original reading and conveying apparatus of claim 1 wherein the driven conveying roller includes a pair of pressure springs.

5. The original reading and conveying apparatus of claim 1 wherein the transparent plate is made of glass, and the synthetic resin layer is made of silicone rubber.

6. The original reading and conveying apparatus of claim 1, wherein the driving force transmission mechanism is comprised of a gear portion disposed at the small diameter portion of the roller portion of the pressure conveying roller, a gear disposed at a rotation axis of the original conveying roller, and an intermediate gear interposed between the gear portion and the gear.

7. An original reading and conveying apparatus comprising:
    a transparent plate arranged in a reading area of a conveying passage for conveying an original and a pressure conveying roller arranged to confront the transparent plate and be pushed toward the transparent plate,
    wherein at least a circumferential surface of a roller portion of the pressure conveying roller is covered with a synthetic resin layer, and
    wherein an original conveying roller for conveying the original is arranged at a downstream side, as viewed in an original conveying direction, of the pressure conveying roller, which original conveying roller is rotationally driven by a driving force coming from the pressure conveying roller.

8. The original reading and conveying apparatus of claim 7, wherein the roller portion of the original conveying roller is axially shorter than the axial extent of the roller portion of the pressure conveying roller.

9. The original reading and conveying apparatus of claim 7, wherein at least a circumferential surface of the roller portion of the original conveying roller is covered with a rubber layer.

10. The original reading and conveying apparatus of claim 7, further comprising a driven conveying roller cooperating with the original conveying roller,
    wherein at least a circumferential surface of a roller portion of the driven conveying roller is covered with a rubber layer, and the driven conveying roller is elastically biased toward the original conveying roller.

11. The original reading and conveying apparatus of claim 10 wherein the driven conveying roller includes a pair of pressure springs.

12. The original reading and conveying apparatus of claim 7 wherein the transparent plate is made of glass, and the synthetic resin layer is made of silicone rubber.

* * * * *